April 5, 1966 S. BARBIERI 3,244,068
FOCUSING DEVICE FOR A PHOTOGRAPHIC ENLARGER
Filed Aug. 12, 1963 2 Sheets-Sheet 1
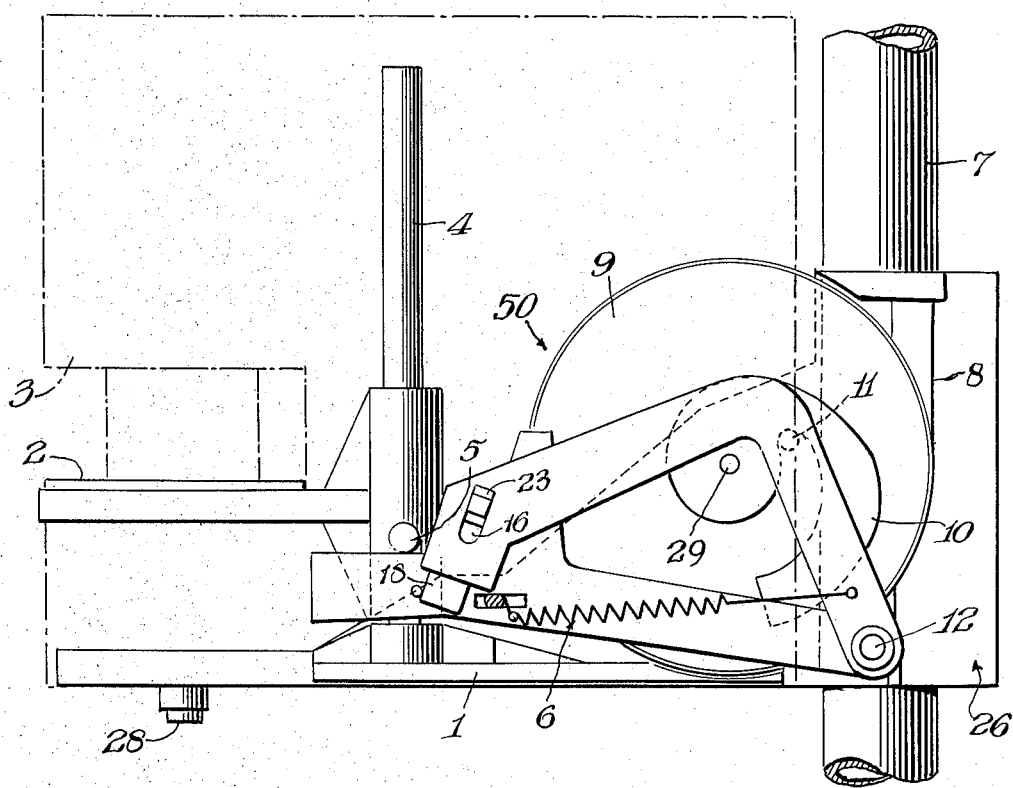
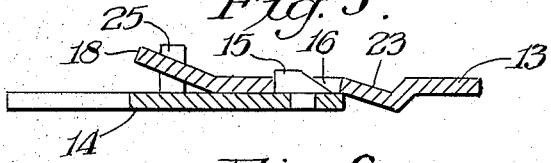
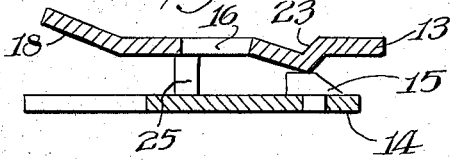
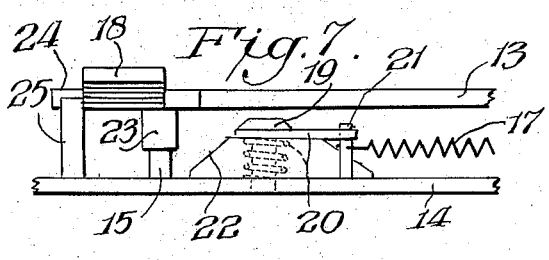
INVENTOR
Sigisfredo Barbieri
BY Connolly and Hutz
ATTORNEYS

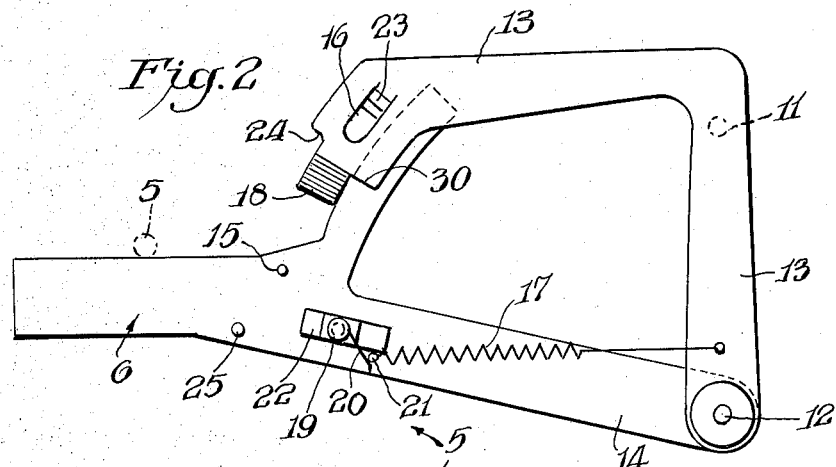
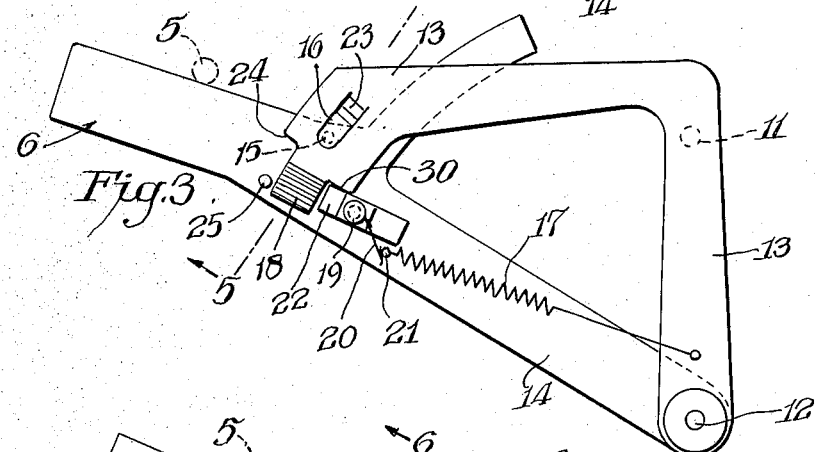
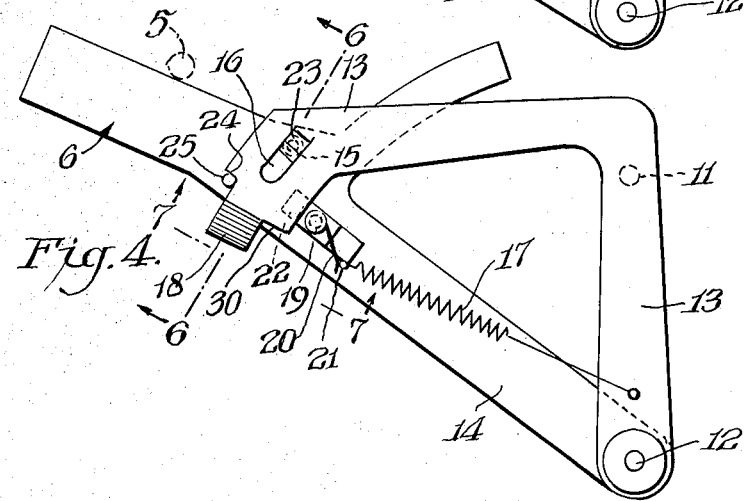

United States Patent Office 3,244,068
Patented Apr. 5, 1966

3,244,068
FOCUSING DEVICE FOR A PHOTOGRAPHIC ENLARGER
Sigisfredo Barbieri, Bressanone, Italy, assignor to Durst A.G. Fabrik Fototechnischer Apparate, Bolzano-Bozen, Italy
Filed Aug. 12, 1963, Ser. No. 301,507
Claims priority, application Italy, Dec. 20, 1962, 25,037/62
11 Claims. (Cl. 88—24)

This invention relates to a photographic enlarger having an automatic focusing arrangement, and it more particularly relates to such an arrangement which is automatically engaged and disengaged.

Enlarging devices having provisions for automatic focusing usually incorporates a lens of constant focal length having a limited enlarging range. To extend their enlarging range up and down when required, the automatic focusing device must be disengaged which permits the focusing to be manually performed through an extended range.

In color enlarging devices having the light elements for measuring the color content of the transparency being enlarged arranged in the plane of the objective lens, any automatic focusing device must be disengageable. This permits the transparency to be brought to a predetermined fixed distance from the light measuring elements for measuring its color content before exposure to insure that the light measuring elements are uniformly illuminated independent of the enlarging scale. This distance is arranged to be as short as possible with reference to the path of the light rays. The above pertains to an arrangement in which the position of the objective lens is adjusted with respect to the column for focusing. Where focusing is accomplished by adjustment of the transparency or negative carrier, it also must be disengageable from an automatic focusing device to be brought to the color content measuring position.

Automatic focusing devices are available which are disengageable manually or by contact of a release lever, and the movable focusing element is then manually raised or lowered to the focused position.

It is highly desirable with such devices to have the focusing mechanism easily accessible and to prevent the focusing element from being disengaged before it is supported. Otherwise it might drop and become damaged because of its substantial weight. Existing automatic focusing devices therefore require careful operation to safely disengage them.

An object of this invention is to provide an automatic engaging and disengaging device for an automatic focusing arrangement of a photographic enlarger.

In accordance with this invention the motion-transmitting linkage of an automatic focusing photographic enlarger incorporates an input element connected to the column and an output element connected to the focusing element. A disengageable latch couples the elements together during automatic focusing. When the focusing element is slightly raised by the operator from its normal automatic focusing position, the latch between the elements is disengaged to permit the focusing element to be manually adjusted. A resilient support prevents the focusing element from freely dropping when it is disengaged form manual adjustment. Re-engagement automatically occurs when the focusing element is manually repositioned in its normal automatic focusing position. This automatic dis- and re-engagement permits the operator to use both hands for manipulating the focusing element and prevents disengagement unless the element is held by the operator.

The elements of the linkage may advantageosuly be levers that themselves act as part of the latch that couples then together. They are accordingly free to flex away from each other to enable an insert to slide between them when the focusing element is raised above its normal automatic focusing position. This insert remains between them to hold their latch open until the output lever is lowered past its normal automatic focusing position, whereupon the insert drops out to cause the levers to become re-engaged when the focusing element is again raised to its normal automatic focusing position.

Novel features and advantages of the present invention will become apparent to one skilled in the art from a reading of the following description in conjunction with the accompanying drawings wherein similar reference characters refer to similar parts and in which:

FIG. 1 is a side view in elevation of an automatic focusing arrangement which is one embodiment of this invention in conjunction with portions of a photographic enlarger to which it is connected;

FIGS. 2-4 are side views in elevation of the embodiment of the invention shown in FIG. 1 showing its various phases of operation;

FIG. 5 is a cross-sectional view through FIG. 3 along the line 5—5;

FIG. 6 is a cross-sectional view through FIG. 4 along the line 6—6 and

FIG. 7 is a cross-sectional view through FIG. 4 along the line 7—7.

In FIG. 1 as shown an automatically focused photographic enlarger somewhat similar to that described in comomnly assigned co-pending U.S. patent application Serial No. 172,647, filed February 12, 1962. Projecting assembly 26 is movably mounted on column 7 above an easel (not shown). Objective lens 28 is connected to lens support 1 on assembly 26 while lamp housing 3 which carries negative platform 2 is movably mounted upon projecting assembly 26 through a sliding connection to rod 4 extending from objective lens support 1. The motion-transmitting linkage 6 of the disengageable automatic focusing device 50 is movably mounted on assembly 26 by means of pivot pin 12. The end of linkage 6 remote from assembly 26 reacts against lamp housing or negative carrier 3 through pin or roller 5, while linkage 6 is connected to a reference coupling through a follower pin or roller 11 engaged with reference coupling cam 10 which rotates on shaft 29 on projecting assembly 26. The reference coupling also includes a belt or cable 8 on driving pulley 9 connected to cam 10 and to a portion of column 7. As assembly 26 is moved toward or away from the easel the motion is transmitted to the reference coupling and to linkage 6 to automatically adjust the position of focusing element or negative carrier 3.

As shown in FIGS. 2-4 linkage 6 comprises two scissor-like elements or levers 13 and 14 which are resiliently mounted on pivot pin or shaft 12 to move toward and away from each other's planes. Bow-shaped input lever 13 carries follower or roller 11, and thus is maintained in the normal automatic focusing position by the reference coupling in both the engaged as well as the disengaged state. However output lever 14 is not influenced by the movement of the reference coupling but inactively remains in its lowest position due to the weight of negative carrier 3 through roller 5. In th engaged state when latching pin or hook 15 is in slot 16 output lever 14 transmits the movement of the reference coupling to negative carrier 3.

In FIG. 2 linkage 6 is shown in the disengaged state. Spring 17 biases output lever 14 upwardly against the weight of negative carrier 3 and also presses both levers 13 and 14 laterally together. As negative carrier 3 is raised latching pin 15 moves under upturned end 18 of input lever 13 to laterally deflect the levers. Lever 13 is notched at both corners of its free end to provide a pair of abutment shoulders 30 and 24. Shoulder 30 contacts insert or lug 22 which is mounted on output lever 14 by means of set screw or pivot pin 19. The distance from lug 22 to latching pin 15 is less than the distance from shoulder 30 to slot 16 so that shoulder 30 contacts lug 22 before pin 15 enters slot 16. Additionally the height of lug 22 is greater than that of pin 15 so that the lateral deflection caused by pin 15 is not sufficient to permit lug 22 to slide between the levers.

As shown in FIG. 3 when negative carrier 3 is raised to the normal focusing position pin 15 enters slot 16 to engage levers 13 and 14 together. Since the resilient mounting of the levers maintains them laterally together, the levers are actually a part of the latching means. In this normal automatic focusing position with the levers in the engaged state, the photographic enlarger is used to automatically focus.

For manual focusing the operator slightly raises the negative carrier 3 and an operating means between the levers including insert 22 and inclined tongue 23 which contacts the latching means disengages the levers. As shown in FIG. 4 pin 15 contacts inclined tongue 23 to cam the levers apart. The lateral deflection caused by pin 15 and tongue 23 is greater than the height of lug 22 so that lug 22 slides between the levers and is urged to its original position by spring 20 on pin 21. Simultaneously shoulder 24 contacts stop pin 25 on output lever 14 to prevent output lever 14 from further upward rotation.

As negative carrier 3 is lowered past its normal automatic focusing position lug or insert 22 is of such a width that it remains between the levers to prevent pin 15 from reentering slot 16 and maintains the levers deflected until lug 22 is below shoulder 30. During the disengaged state if the operator releases focusing element 3 spring 17 is of such a strength that negative carrier 3 slowly falls to its lowest position. Spring 17 may be of sufficient strength to hold negative carrier 3 in place when it is released.

To return to automatic focusing, negative carrier 3 is again raised to its normal automatic focusing position. Shoulder 30 causes lug 22 to pivot and pin 15 enters slot 16 to engage the levers for automatic focusing.

With the aforedescribed focusing device, the user is never required to manually manipulate the control linkage for engaging or disengaging. The engaging automatically results only when the negative carrier is raised to the normal automatic focusing position. The operating means including camming tongue 23 and insert 22 automatically disengages the levers when the negative carrier is raised above the normal focusing position and maintains the latch including pin 15 and slot 16 disengaged as the negative carrier is lowered past the normal focusing position.

What is claimed is:

1. A disengageable automatic focusing device for a photographic enlarger having a projecting assembly movably mounted upon a column above an easel, comprising a motion-transmitting linkage, movable means mounting said linkage upon said projecting assembly, a focusing element upon said projecting assembly, reference coupling means connecting said linkage to said easel for causing said linkage to automatically adjust the position of said focusing element in accordance with the distance of said projecting assembly from said easel, said linkage incorporating an input element connected to said reference coupling means and an output element connected to said focusing element, resilient means biasing said output element upwardly against the weight of said focusing element whereby said output element follows said focusing element and helps support said focusing element, disengageable latching means engaging said input and said output elements together when they are disposed in a normal focusing position for automatically adjusting said focusing element in response to movement of said projecting assembly upon said column relative to said easel, operating means contacting said latching means for automatically disengaging said input and said output elements from each other when the weight of said focusing element is manually removed from said linkage by being raised above said normal focusing position with said input element being maintained by said reference coupling means in said normal focusing position for permitting manual adjustment of said focusing element, and said operating means being arranged to cause re-engagement of said latching means upon manual movement of said focusing element and said output element back to said normal focusing position.

2. A focusing device as set forth in claim 1 wherein said input and said output elements comprise levers.

3. A focusing device as set forth in claim 2 wherein said latching means and said operating means are constructed and arranged to maintain said latching means disengaged when said output lever is moved downwardly past said normal focusing position of said input lever and for causing said latching means to re-engage said levers with each other when said focusing element and said following output lever are manually moved back to said normal focusing position.

4. A focusing device as set forth in claim 2 wherein said disengageable latching means comprises portions of said levers are disposed side-by-side and being constructed and arranged to move away from each other's planes, said operating means including camming means disposed between said levers for disengaging said latching means when said output lever is raised above its normal focusing position and said weight of said focusing element is raised from said output lever and said resilient means causes said output lever to follow the upward movement of said focusing means and help support it.

5. A focusing device as set forth in claim 4 wherein insert means is mounted between said levers for insertion between them to maintain said latching means open upon downward movement of said output lever past said normal focusing position.

6. A focusing device as set forth in claim 5 wherein said insert means comprises a lug, pivot means mounting said lug upon a portion of said output lever disposed in the path of movement of the portion of said input lever which it engages, resilient means biasing said lug into a position disposed between said levers in their engaged position when they are moved away from each other by said camming means whereby it is inserted between said levers when said output lever is raised above said normal focusing position, said lug being wide enough to remain between said levers until after said output lever is moved downwardly past the normal focusing position of said input lever to prevent said latch from engaging upon a downward movement of said output lever after an upward disengaging movement of said output lever, the rotatable mounting of said lug permitting it to move out of the path of said input lever sliding side by side with said output lever and upon upward movement of said output lever relative thereto to permit said latch to re-engage.

7. A focusing device as set forth in claim 6 wherein said disengageable latching means includes a pin on one of said levers and a slot on the other of said levers, said camming means including an inclined tongue on said slotted lever in the path of motion of said pin, the reflective/deflection of said levers when said pin contacts said inclined tongue being greater than the height of said lug whereby said lug is caused to rotate between said levers when said pin contacts said inclined tongue.

8. A focusing device as set forth in claim 7 wherein said input lever is bow-shaped, said slot being in one end of said bow-shaped lever, said one end of said bow-shaped lever sloping away from said pin to facilitate said pin entering said slot.

9. A focusing device as set forth in claim 8 wherein one corner of said bow-shaped lever is notched, said one corner being disposed in the path of motion of said lug.

10. A focusing device as set forth in claim 9 wherein the distance from said lug to said pin on said output lever is less than the distance from said one corner to said slot on said input lever whereby said one corner contacts said lug before said pin enters said slot and said lug remains between said levers until said pin is lowered beyond said slot.

11. A focusing device as set forth in claim 10 wherein the other corner of said one end of said bow-shaped lever is notched and a stop pin being located on said output lever disposed in the path of motion of said other corner to limit the amount which said output lever can be raised.

No references cited.

NORTON ANSHER, *Primary Examiner.*